US009320052B2

(12) United States Patent
Keerthi

(10) Patent No.: US 9,320,052 B2
(45) Date of Patent: Apr. 19, 2016

(54) RESOLVING SPECTRAL ALLOCATION CONFLICTS IN MOBILE NETWORKS

(71) Applicant: Empire Technology Development LLC, Wilmington, DE (US)

(72) Inventor: Arvind Vijay Keerthi, Karnataka (IN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 91 days.

(21) Appl. No.: 14/354,112

(22) PCT Filed: Jun. 24, 2013

(86) PCT No.: PCT/US2013/047366
§ 371 (c)(1),
(2) Date: Apr. 24, 2014

(87) PCT Pub. No.: WO2014/175904
PCT Pub. Date: Oct. 30, 2014

(65) Prior Publication Data
US 2015/0271703 A1 Sep. 24, 2015

(30) Foreign Application Priority Data
Apr. 22, 2013 (IN) .......................... 1760/CHE/2013

(51) Int. Cl.
*H04W 72/12* (2009.01)
*H04L 5/00* (2006.01)

(52) U.S. Cl.
CPC ............ *H04W 72/1226* (2013.01); *H04L 5/00* (2013.01)

(58) Field of Classification Search
None
See application file for complete search history.

(56) References Cited

U.S. PATENT DOCUMENTS

| 6,868,277 B1 | 3/2005 | Cerwall et al. |
| 2002/0009101 A1* | 1/2002 | Niemela ............... H04W 28/06 370/523 |
| 2006/0176965 A1* | 8/2006 | Furman ................ H04B 1/1036 375/260 |

(Continued)

FOREIGN PATENT DOCUMENTS

WO 2011081809 A2 7/2011

OTHER PUBLICATIONS

Aissa, I., et al., "A Joint Three Compensation round based scheduling Algorithm and a dynamic resource allocation procedure for OFDMA Cognitive systems," IJCSNS International Journal of Computer Science and Network Security, vol. 11, No. 6, (2011).

(Continued)

*Primary Examiner* — Donald Mills
(74) *Attorney, Agent, or Firm* — Turk IP Law, LLC

(57) ABSTRACT

Technologies are generally described for reducing spectral allocation conflicts in wireless networks. In some examples, two (or more) wireless devices with intersecting spectral allocation may be identified, followed by determination of one or more time-frequency vectors of the spectral allocation for one of the wireless devices that have a first overlap with one or more time-frequency vectors of the spectral allocation of the other wireless device. For each determined time-frequency vector, an alternate time-frequency vector may be determined such that a second overlap between the alternate time-frequency vector and the time-frequency vectors of the other wireless device is lower than the first overlap. The alternate time-frequency vector may be transmitted to the wireless device to enable that device shift its communication to the alternate time-frequency vector for enhanced communication performance.

21 Claims, 9 Drawing Sheets

(56) References Cited

U.S. PATENT DOCUMENTS

| | | | |
|---|---|---|---|
| 2007/0060058 A1* | 3/2007 | Shattil | H04B 7/0857 455/63.1 |
| 2007/0183547 A1* | 8/2007 | Fifield | H04B 1/123 375/349 |
| 2008/0205491 A1* | 8/2008 | Berens | H04B 1/1036 375/148 |
| 2009/0131068 A1 | 5/2009 | Wu et al. | |
| 2009/0180403 A1* | 7/2009 | Tudosoiu | H04B 1/006 370/278 |
| 2010/0085913 A1* | 4/2010 | Subrahmanya | H04B 1/7075 370/328 |
| 2010/0226356 A1* | 9/2010 | Sahin | H04J 11/004 370/342 |
| 2011/0122846 A1* | 5/2011 | Yu | H04L 1/0042 370/335 |
| 2011/0177821 A1* | 7/2011 | Senarath | H04W 72/0446 455/450 |
| 2012/0155294 A1 | 6/2012 | Park | |
| 2012/0208553 A1 | 8/2012 | Alles et al. | |

OTHER PUBLICATIONS

Chen, Y. M., "Low Overhead Spectrum Allocation and Secondary Access in Cognitive Radio Networks," International Journal of Information and Communication Technology Research, vol. 2, No. 3, pp. 248-253, ICT Journal (2012).

International Search Report and Written Opinion for Intl. Pat. Appln. No. PCT/US2013/047366, mailed Feb. 7, 2014, 19 pp.

* cited by examiner

COMPUTER PROGRAM PRODUCT 900

SIGNAL-BEARING MEDIUM 902

904 AT LEAST ONE OF
    ONE OR MORE INSTRUCTIONS FOR IDENTIFYING SECOND MOBILE DEVICE WHOSE SPECTRAL ALLOCATION INTERSECTS WITH THE SPECTRAL ALLOCATION OF A FIRST MOBILE DEVICE;
    ONE OR MORE INSTRUCTIONS FOR DETERMINING OVERLAPPING TIME-FREQUENCY VECTOR(S) FOR FIRST MOBILE DEVICE OVERLAPPING WITH TIME-FREQUENCY VECTOR(S) OF SECOND MOBILE DEVICE;
    ONE OR MORE INSTRUCTIONS FOR EACH OVERLAPPING TIME-FREQUENCY VECTOR DETERMINING AN ALTERNATE TIME-FREQUENCY VECTOR WITH REDUCED OVERLAP; AND
    ONE OR MORE INSTRUCTIONS FOR TRANSMITTING ALTERNATE TIME-FREQUENCY VECTOR.

| COMPUTER-READABLE MEDIUM 906 | RECORDABLE MEDIUM 908 | COMMUNICATIONS MEDIUM 910 |

FIG. 9

RESOLVING SPECTRAL ALLOCATION CONFLICTS IN MOBILE NETWORKS

This Application is the National Stage filing under 35 U.S.C. §371 of PCT Application Ser. No. PCT/US13/47366 filed on Jun. 24, 2013. The PCT Application and its priority India Application No. 1760/CHE/2013 filed on Apr. 22, 2013, are herein incorporated by reference in their entireties.

BACKGROUND

Unless otherwise indicated herein, the materials described in this section are not prior art to the claims in this application and are not admitted to be prior art by inclusion in this section.

Transmission from a base-station to a mobile device may be spread across in time and frequency using a spreading technique, such as orthogonal frequency division multiple access (OFDMA). A spreading technique may be used in many modern mobile standards, such as Long Term Evolution (LTE), to assign time and frequency slots to individual user devices.

Base stations may determine spectral allocations (time slots and frequencies or channels) for mobile devices within their coverage area to provide better signal-to-noise performance for the devices. However, the spectral allocations for different mobile devices may sometimes overlap meaning that at some point in time two or more mobile devices may be allocated to the same sub-carrier. As the time-frequency space becomes gradually filled by early users, later users may have to settle for remaining slots, which may not be optimal (e.g., from a signal-to-noise ratio) from their viewpoint.

SUMMARY

The present disclosure generally describes methods, apparatus, systems, devices, and/or computer program products for resolving spectral allocation conflicts in mobile networks.

In some examples, various methods for reducing spectral allocation conflicts in wireless networks are described. Example methods may include identifying a second mobile device with a second spectral allocation, for a first mobile device with a first spectral allocation, where there is an intersection between the first spectral allocation and the second spectral allocation. Example methods may also include determining, for the first mobile device, one or more time-frequency vectors of the first spectral allocation that overlap with one or more time-frequency vectors of the second spectral allocation of the second mobile device. The methods may further include for each determined time-frequency vector, determining an alternate time-frequency vector such that a second overlap between the alternate time-frequency vector and the one or more time-frequency vectors of the second spectral allocation is lower than the first overlap.

In other examples, controllers for a wireless network configured to employ spectral allocation conflict reduction are described. An example controller may include a communication module configured to communicate with a plurality of mobile devices over a wireless network and a processor coupled to the communication module. The processor may be configured to identify a second mobile device with a second spectral allocation, for a first mobile device with a first spectral allocation, where there is an intersection between the first spectral allocation and the second spectral allocation. The processor may also determine, for the first mobile device, one or more time-frequency vectors of the first spectral allocation that overlap with one or more time-frequency vectors of the second spectral allocation of the second mobile device. The processor may further determine an alternate time-frequency vector for each determined time-frequency vector such that an overlap between the alternate time-frequency vector and the one or more time-frequency vectors of the second spectral allocation is lower than the first overlap.

In further examples, an analysis server for analyzing sub-carrier allocation data to categorize clusters for predictive spectral allocation in wireless networks is described. The analysis server may include a memory configured to store instructions and a processor coupled to the memory. The processor may be configured to identify a second mobile device with a second spectral allocation, for a first mobile device with a first spectral allocation, where there is an intersection between the first spectral allocation and the second spectral allocation. The processor may also determine, for the first mobile device, one or more time-frequency vectors of the first spectral allocation that overlap with one or more time-frequency vectors of the second spectral allocation of the second mobile device. The processor may further determine an alternate time-frequency vector for each determined time-frequency vector such that an overlap between the alternate time-frequency vector and the one or more time-frequency vectors of the second spectral allocation is lower than the first overlap.

In yet other examples, methods for reducing spectral allocation conflicts in wireless networks are described. An example method may include identifying a second antenna of a wireless device with a second spectral allocation for a first antenna of the same wireless device with a first spectral allocation, where there is an intersection between the first spectral allocation and the second spectral allocation. The example method may further include determining, for the first antenna, one or more time-frequency vectors of the first spectral allocation that overlap with one or more time-frequency vectors of the second spectral allocation of the second antenna. The method may also include for each determined time-frequency vector, determining an alternate time-frequency vector such that an overlap between the alternate time-frequency vector and the one or more time-frequency vectors of the second spectral allocation is lower than the first overlap.

In yet further examples, a computer-readable storage medium with instructions stored thereon for reducing spectral allocation conflicts in wireless networks is described. The instructions may cause a method to be performed when executed, where the method is similar to the example method described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 9 illustrates a block diagram of an example computer program product for implementing spectral allocation conflict resolution in wireless networks;

Figure 1:
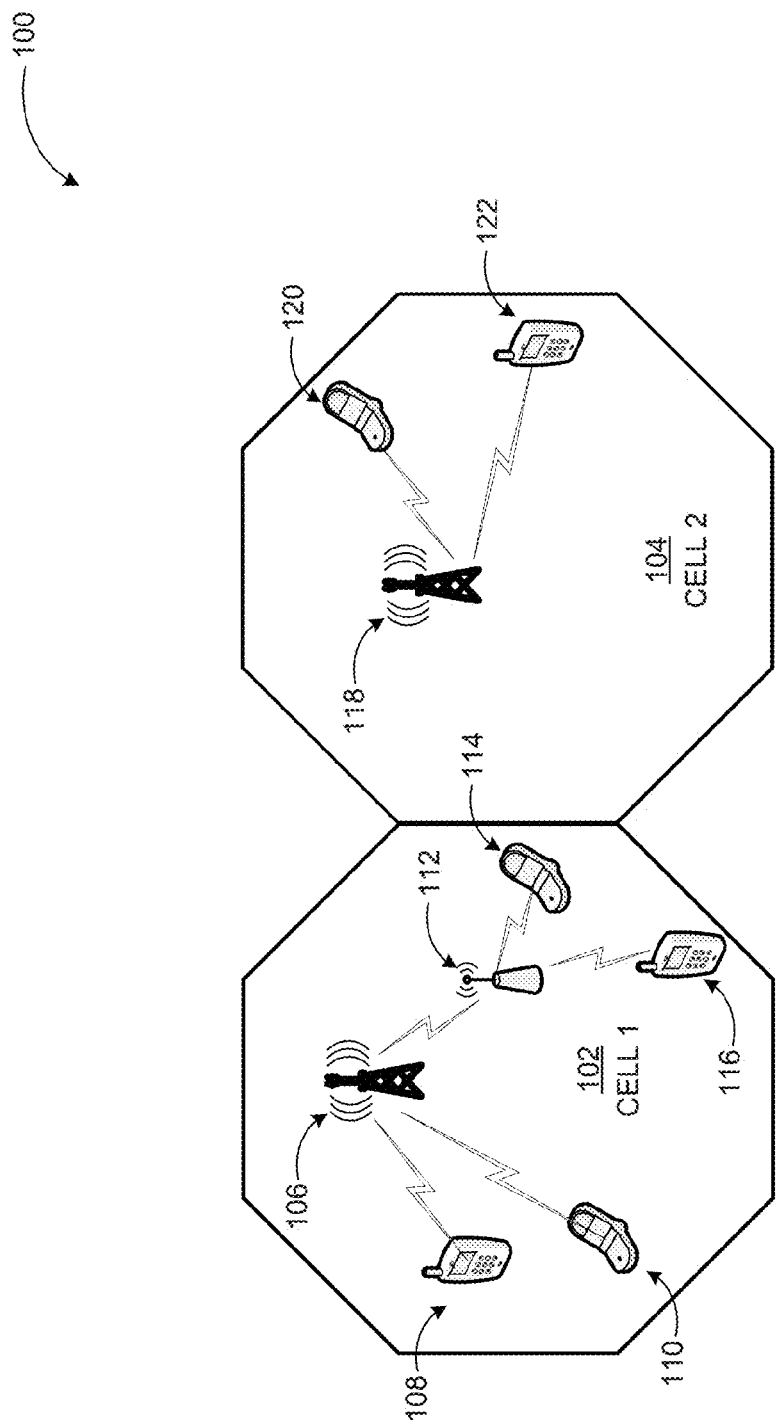
FIG. 1 illustrates two cells of an example cellular communication system, where spectral allocation conflict resolution may be implemented.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to resolving spectral allocation conflicts in wireless networks.

Briefly stated, technologies are described for reducing spectral allocation conflicts in wireless networks. In some examples, two (or more) wireless devices with intersecting spectral allocation may be identified, followed by determination of one or more time-frequency vectors of the spectral allocation for one of the wireless devices that have a first overlap with one or more time-frequency vectors of the spectral allocation of the other wireless device. For each determined time-frequency vector, an alternate time-frequency vector may be determined such that a second overlap between the alternate time-frequency vector and the time-frequency vectors of the other wireless device is lower than the first overlap. The alternate time-frequency vector may be transmitted to the wireless device to enable that device shift its communication to the alternate time-frequency vector for enhanced communication performance.

The terms wireless device, end user device, and mobile device are used herein interchangeably referring to communication devices that are configured to communicate wirelessly with other communication devices according to a network communication protocol via one or more base stations. Cellular phones, wirelessly equipped computers (e.g., laptops, tablets, etc.) are some examples of such devices. The wireless networks providing the infrastructure may employ a number of wireless communication technologies. Furthermore, the communication devices need not be mobile; they may include stationary, vehicle-mount, handheld, wearable, and similar devices. Moreover, embodiments may also be implemented in wireless devices with multiple antennas, where the antennas—attached to the same enclosure—may be assigned respective spectral allocations.

FIG. 1 illustrates two cells of an example cellular communication system, where spectral allocation conflict resolution may be implemented, arranged in accordance with at least some embodiments described herein.

Some wireless communication networks, specifically cellular communication systems employ "cells" as the network infrastructure. Each cell is typically served by a base station that enables end user devices (EUs), in this case mobile devices, to communicate wirelessly with other EUs within the same cell, in other cells, and in other systems. As shown in a diagram 100, a geographic area of a wireless network may be divided into two neighboring cells, cell 1 102 and cell 2 104. Cell 1 102 may be served by a base station (BTS) 106 and may include end user devices 108, 110, 114, and 116. Cell 2 104, may be served by a base station 118 and may include end user devices 120 and 122.

In some scenarios, a relay device 112 may be employed to facilitate communication between one or more EUs (e.g., EUs 114 and 116) and their base station (e.g., BTS 106). For example, when the wireless signal is weak in a particular location due to interference, geographic structure, manmade obstructions, etc., a relay device may assist in establishing a reliable link between the base station and the EUs.

A wireless network may be one of an Evolved Universal Mobile Telecommunications System Terrestrial Radio Access Network (eUTRAN), a long term evolution (LTE) network, an LTE-Advanced network, a high speed packet access (HSPA) network, or an HSPA-Advanced network. A mobile device may include one of a cellular phone, a smart phone, a computing device equipped with cellular communication capability, or a specialized device equipped with cellular communication capability. Furthermore, a wireless communication technology between a base station and a mobile device may utilize one of frequency division multiple access (FDMA), orthogonal frequency division multiple access (OFDMA), Carrier-Sense Multiple Access (CSMA), or a narrow band allocation technology. The wireless communication between a base station and a mobile device may be subject to degradation arising out of interference from other users, frequency selectivity of the radio channel, and fading of the radio channel. It may be desirable to use time-frequency slots that provide highest quality for communication. For example, those time-frequency slots may be least corrupted by interference or fading, and or may enjoy a frequency-selectivity peak. Interference may arise out of the activity of neighboring base-stations and users. However, the activity alone may not be sufficient to indicate that interference may be high at a certain sub-carrier and low at another for a particular mobile's location. Likewise, the frequency selectivity may be dependent on the multipath profile and hence the local geography. However, the dependence may not indicate which sub-carrier may have a high SNR, because the multipath profile faced by a particular mobile device may not be known. Fading may be an even more complex phenomenon depending on the speed of change of multipath.

Various statistical models predicting parameters may be used to determine spectral allocations for the wireless devices. For example, a "goodness" of particular time-frequency vectors may be measure or predicted and good clusters of such vectors may be determined. Spectral allocation to the wireless devices may be based on respective good clusters. As discussed above, spectral allocations of two or more wireless devices may intersect partially or completely. The intersection may cause interference causing a degradation of experience for wireless device users. A system according to some embodiments may address such concerns by identifying wireless devices with intersecting spectral allocation, determining one or more overlapping time-frequency vectors, and determining an alternate time-frequency vector for each overlapping time-frequency vector such that the overlap between the alternate time-frequency vector and the determined time-frequency vector is minimal.

Figure 2:
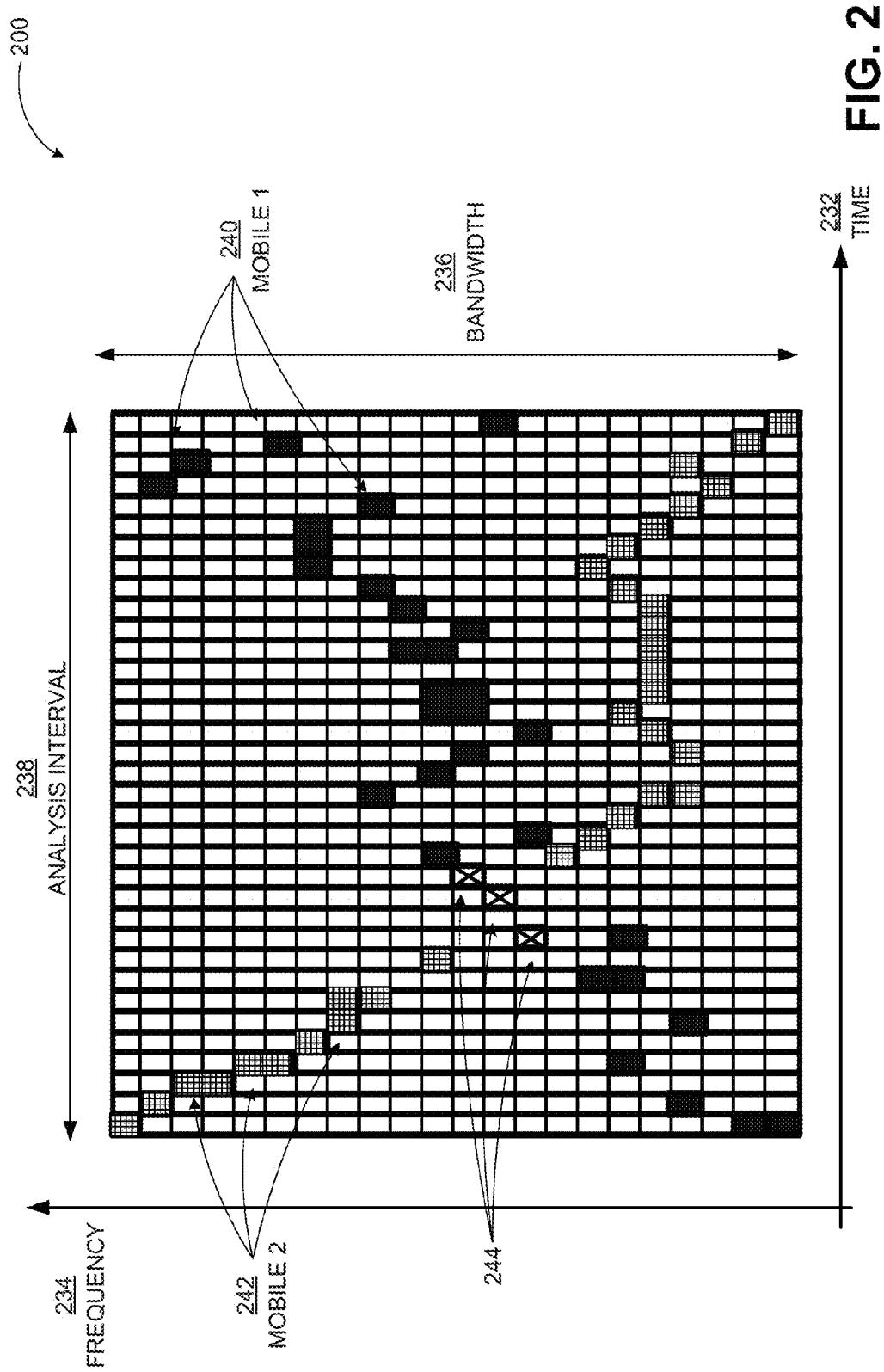
FIG. 2 illustrates conceptually an example spectral allocation conflict in a wireless network.

FIG. 2 illustrates conceptually an example spectral allocation conflict in a wireless network, arranged in accordance with at least some embodiments described herein.

As shown in a diagram 200, time 232 may be plotted against frequency 234 within a wireless network to define a time-frequency slot. For example, a 24-hour day may be divided into five-second analysis intervals 238 to represent time and an available bandwidth 236 of the network may be divided into available frequencies or channels forming grid cells representing available time-frequency slots that can be allocated to wireless devices. Shaded slots may represent spectral allotments for a given wireless device, each shaded slot being associated with a "goodness" indicator value for that particular time-frequency slot.

For example, a single-carrier LTE deployment may have a time unit of one millisecond and roughly 1000 possible frequency slots for each time unit. Therefore, one five-second analysis interval may include about five million time-frequency slots. A wireless device may receive a small fraction, approximately less than 1%, of these five million slots as its spectral allocation. In FIG. 2, the region occupied by the time-frequency slots allocated to the wireless device is shown using shaded slots. The length of the analysis interval may be adjusted depending on a time of day, a day of week, a day of month, a season, location of mobile device, and/or an expected population change within a geographic area.

The shaded slots may have a measure of "goodness" associated with them. For example, a wireless device may auto-report a channel-quality indicator (CQI) every several timeslots. An average of the CQIs may be taken over a five-second interval to serve as a goodness-indicator for that analysis interval. If an audio call for a wireless device fails within the five-second interval then the goodness-indicator may be low. The wireless device may also report one or more other quality indicators, such as a received signal strength indicator (RSSI), a bit error rate (BER), a number of packet retransmissions, a signal to noise ratio (S/N), a number of call failures, a user feedback, a user requested power-down at the same bit-rate, and/or a user requested power-up. One or more of these quality indicators may be used to compute "goodness" of a time-frequency slot.

Diagram 200 illustrates allocated time-frequency vectors (also referred to as "spectral path") for two wireless devices that are served by the same base station. The dark-filled slots 240 may be assigned to a first wireless device (mobile 1) and the hatched slots 242 may be assigned to a second wireless device (mobile 2). With each base station serving potentially numerous wireless devices, the spectral paths of different wireless devices may intersect. A degree of intersection may vary depending on available frequencies, number of active wireless devices, wireless device locations, and similar factors. In the illustrated example scenario, three time-frequency slots 244 are common to the spectral allocation for both wireless devices. Thus, if both devices happen to use one or more of the three time-frequency slots 244 at the same time, one or both of the devices may experience a lower quality of communication, such as a dropped call.

While the examples above are described with time-frequency vector allocation to individual wireless devices, a similar allocation may also be made to individual antennas associated with a single wireless device using the principles described herein.

Figure 3:
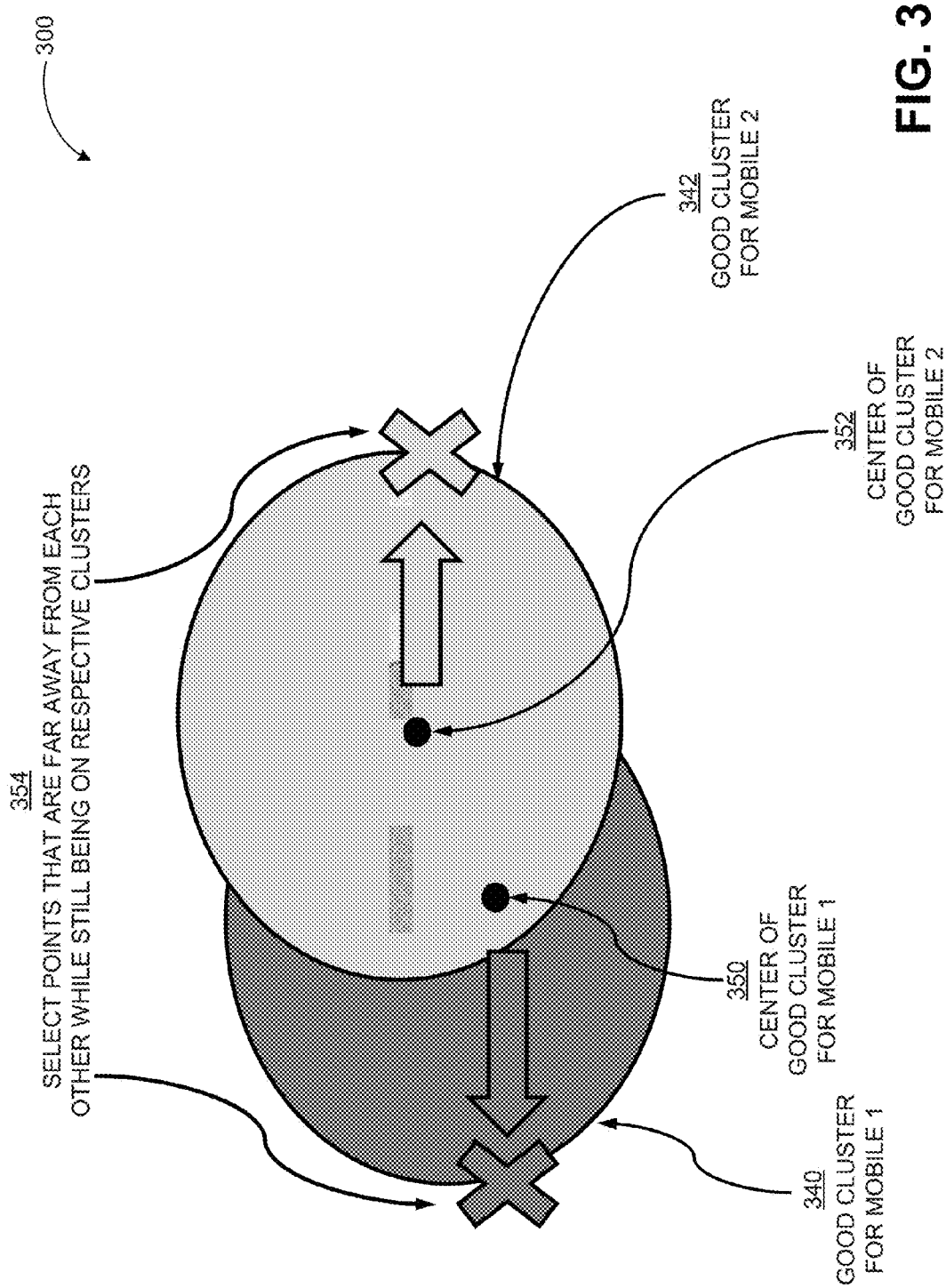
FIG. 3 illustrates selection of two example points in good clusters for resolving spectral allocation conflicts.

FIG. 3 illustrates selection of two example points in good clusters for resolving spectral allocation conflicts, arranged in accordance with at least some embodiments described herein.

To enhance mobile device users' experiences, a cluster of historically well-performing points may be developed in feature space for a mobile device at a given location. The next time the same location is traversed (even by a different mobile device), a point from a well-performing cluster may be selected and the corresponding spectral path used for transmission. As two points in the feature space get close, their corresponding spectral paths may show greater intersection. Thus, for each of two mobile devices competing for spectral resources, if one point is selected from each mobile device's good cluster such that the two selected points are far apart from each other (in terms of vector distance), two spectral paths may be obtained with little-to-zero intersection.

Diagram 300 shows good clusters 340 and 342 for mobile devices 1 and 2, respectively. Being a collection of time-frequency vectors, each good cluster 340 and 342 cover a region in vector space with respective centers 350 and 352. In the illustrated example, the cluster centers 350 and 352 are close to each other, that is the centers have a low vector distance (e.g., a Hamming distance or a Levenshtein distance) between each other. The clusters 340 and 342 (or spectral paths) corresponding to the cluster centers 350 and 352 show considerable intersection. In this example scenario, vectors within the respective good clusters for mobile devices 1 and 2 may be selected such that they are as far apart as possible (354) reducing the likelihood of spectral intersection for the mobile devices 1 and 2.

It may not be necessary for the intersection to be completely reduced to zero. In a universal frequency re-use system, even if a mobile device associated with a base station has no instantaneous intersecting spectrum with another mobile of the same base station, another base station may indeed be transmitting on a sub-carrier currently occupied by the mobile device causing out-of-cell interference. Thus, if two allocated spectral paths have low (but not zero) spectral intersection, then the base station may simply delete the transmission to one of the mobile devices. The mobile device whose transmission has thus been instantaneously deleted may be able to recover the deleted symbol by means of error-control coding, provided a number of such deletions is not large.

Figure 4:
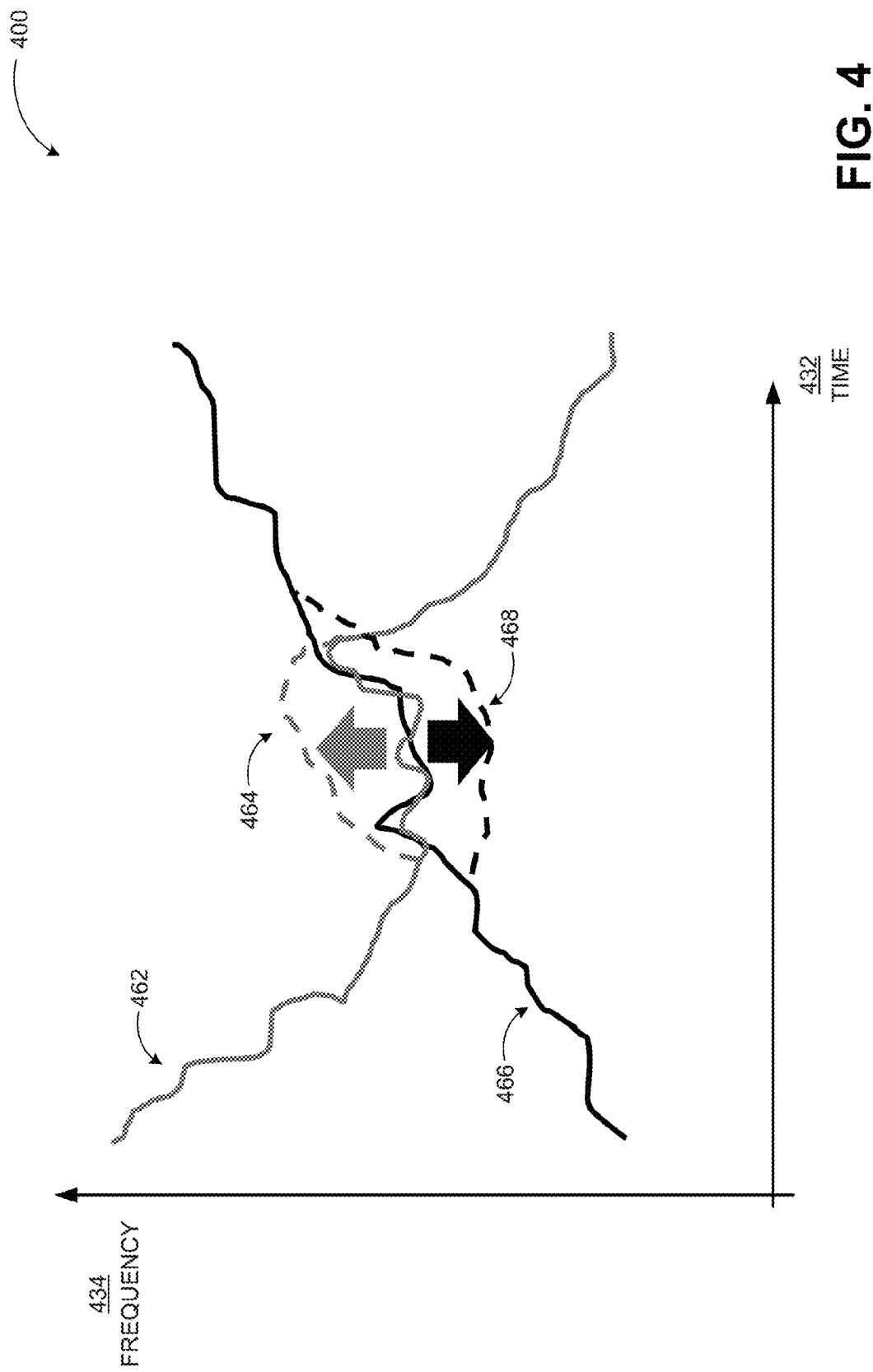
FIG. 4 illustrates a selection of spectral paths free of intersect in an example scenario.

FIG. 4 illustrates a selection of spectral paths free of intersection in an example scenario, arranged in accordance with at least some embodiments described herein.

Diagram 400 shows another visualization of spectral path adjustment to reduce or avoid intersection. In the frequency 434 vs. time 432 plot of diagram 400, spectral paths 462 and 466 of two mobile devices are depicted. As shown in the diagram the spectral paths have partial intersection. If time-frequency vectors in the intersection region are selected, the mobile devices may experience interference. According to some examples, the spectral paths may be adjusted in the intersection region to reduce or remove the intersection. This may be accomplished by adjusting the affected region of one spectral path (e.g., region 464 or 468) or both spectral paths.

In other examples, the distance between the time-frequency vectors may be expressed as a fraction of the length (number of dimensions) of the feature space. Thus, if the distance between two vectors is 10% then that means one-tenth of the entries between the two vectors differ. Furthermore, spectral overlap may be defined as one minus Hamming distance. Thus, a distance of 10% may mean a spectral intersect of 90%—that is 90% of the entries of the two vectors are identical. If two mobile devices' good clusters have a large distance between them, then their spectral paths may not intersect. For these two mobile devices, there may not be a scheduling conflict. Thus, for any mobile device, a potential scheduling conflict may exist for mobile devices whose good clusters are nearby in the feature space. Any suitable metric may be used to measure the vector distance. As discussed above, a Hamming distance, a Levenshtein distance, or similar ones may be employed using the principles described herein.

Figure 5:
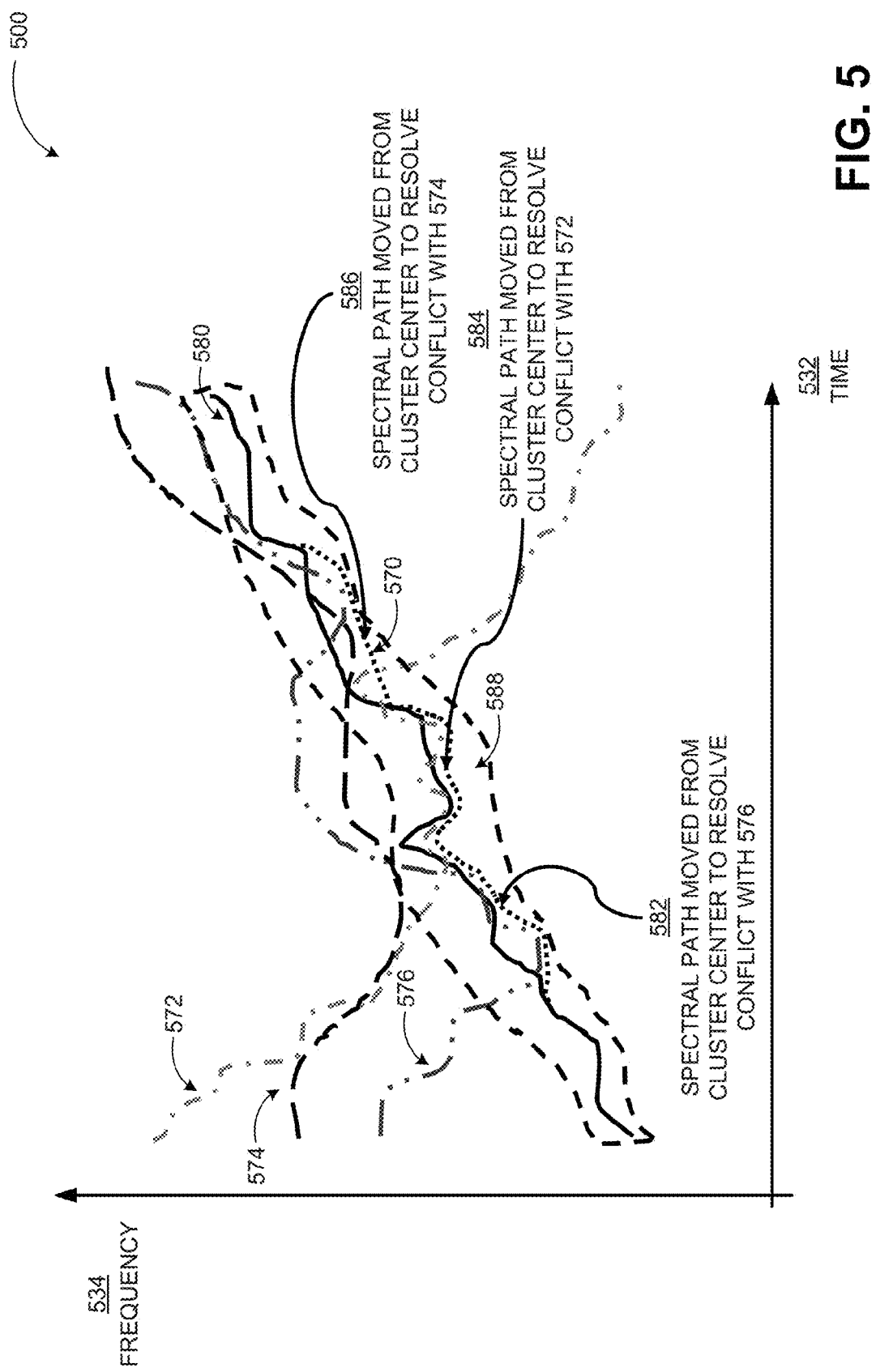
FIG. 5 illustrates an example scenario for resolving conflicts for wireless devices with spectral allocations that are nearby in feature space.

FIG. 5 illustrates an example scenario for resolving spectral allocation conflicts with mobile devices that are nearby in feature space, arranged in accordance with at least some embodiments described herein.

According to some embodiments, for each mobile device in communication with a base station, other nearby mobile devices whose spectral intersection exceeds a predefined threshold (e.g. 10%) may be tracked. These nearby mobile devices may be considered as devices whose spectral paths potentially need separation. In an example cellular network deployment with around 200 users per 10-MHz band, the base station may need to consider for separation 10-15 mobile devices whose spectral paths intersect.

In diagram 500, the mobile device under consideration may have a spectral path based on the center of a good cluster, represented by the solid black line 580. Spectral paths for nearby mobile devices with spectral intersection exceeding a predefined threshold are represented by dashed and dotted lines 572, 574, and 576. The cluster boundary for the mobile device under consideration is indicated by a dashed line surrounding the space, indicated by the shaded region 588, occupied by that mobile device's spectral path.

The base station (or an analysis server) may first determine the time-frequency slots of spectral overlap (Step 1). For the overlapping slots, the base station may determine a conflict-free spectral path of the mobile device under consideration by changing the frequency allocation by choosing a suitable unoccupied slot (e.g., a slot nearest to the slot having spectral overlap) such that the scheduling conflict is resolved—i.e. reduced or removed—(Step 2). It may be desirable to remain within the cluster interior (shaded region 588) when choosing slots away from the cluster center.

The consideration of the nearby mobile devices' spectral paths may result in the spectral path 580 of the mobile device being adjusted multiple times (e.g. adjustments 584, 586, and 582 in response to lines 572, 574, and 576, respectively). As a result, the spectral path of the mobile device under consideration may move from the center of the cluster (solid black line 580) to the dotted black line 570. The spectral path indicated by the dotted black line 570 may not be at the center of the good cluster, but may be substantially conflict-free. Following is an example pseudo-code representing actions to be performed by a base station (or an analysis server) according to some examples.

```
for each mobile do
    allocate the mobile's cluster center as its initial spectral path
end for
for each mobile ("mobile-under-consideration") do
    determine "nearby" mobiles, i.e., those with spectral
    intersection with mobile-under-consideration exceeding a
    threshold;
    for each nearby mobile do
        correct (using Steps 1-2 above) the spectral allocation
        of mobile-under-consideration to resolve conflict with
        nearby mobile
    end for;
end for
```

While the above-described example scenario uses a 10% intersection threshold to consider two mobile devices nearby, this threshold is exemplary and may even be considered as conservative. In general, the threshold may depend on the power and complexity of an error-correcting code employed by the mobile devices. The threshold on spectral intersection may be chosen to be higher when a more powerful error-correcting code is employed.

Various example embodiments are described above using specific values, parameters, and configurations. These examples are for illustration purposes only and are not intended to constitute a limitation on embodiments. Embodiments may be implemented with any reasonable values and suitable parameters and configurations using the principles described herein.

Figure 6:
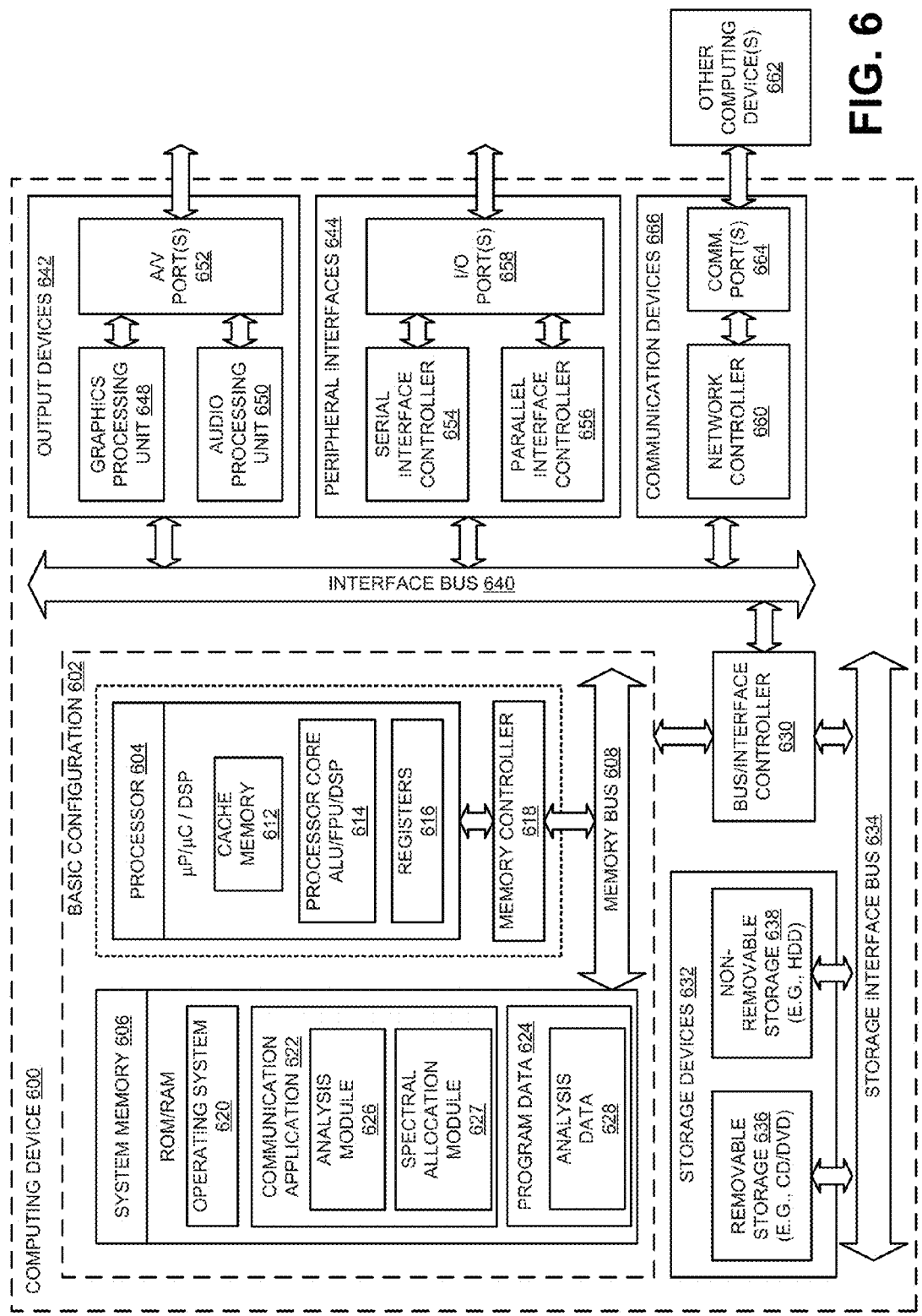
FIG. 6 illustrates a general purpose computing device, which may be used to resolve spectral allocation conflicts in wireless networks.

FIG. 6 illustrates a general purpose computing device, which may be used to resolve spectral allocation conflicts in wireless networks, arranged in accordance with at least some embodiments described herein.

In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level cache memory 612, a processor core 614, and registers 616. Example processor core 614 may include an arithmetic logic unit (ALU), a floating point unit (FPU), a digital signal processing core (DSP Core), or any combination thereof. An example memory controller 6018 may also be used with processor 604, or in some implementations memory controller 614 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more communication applications 622, and program data 624. Communication application 622 may include an analysis module 626 that may receive and analyze indicators associated with the sub-carrier allocations and a spectral allocation module 627 which may resolve spectral allocation conflicts through alternate time-frequency vectors. The communication application 622 may utilize a multiple access technology such as frequency division multiple access (FDMA), orthogonal frequency division multiple access (OFDMA), Carrier-Sense Multiple Access (CSMA), or a narrow band allocation technology to enable communication between a base station and wireless devices. Program data 624 may include one or more of analysis data 628 (e.g. quality of allotted time-frequency slots, conflict information, etc.)

and similar data as discussed above in conjunction with at least FIG. 1 through 5. This data may be useful for resolving spectral allocation conflicts as is described herein. This described basic configuration 602 is illustrated in FIG. 6 by those components within the inner dashed line. Computing device 600 may be implemented as a server in a wireless communication network or as part of a base station in such a network.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM. EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 666 to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Networks for a networked system including computing device 600 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 7:
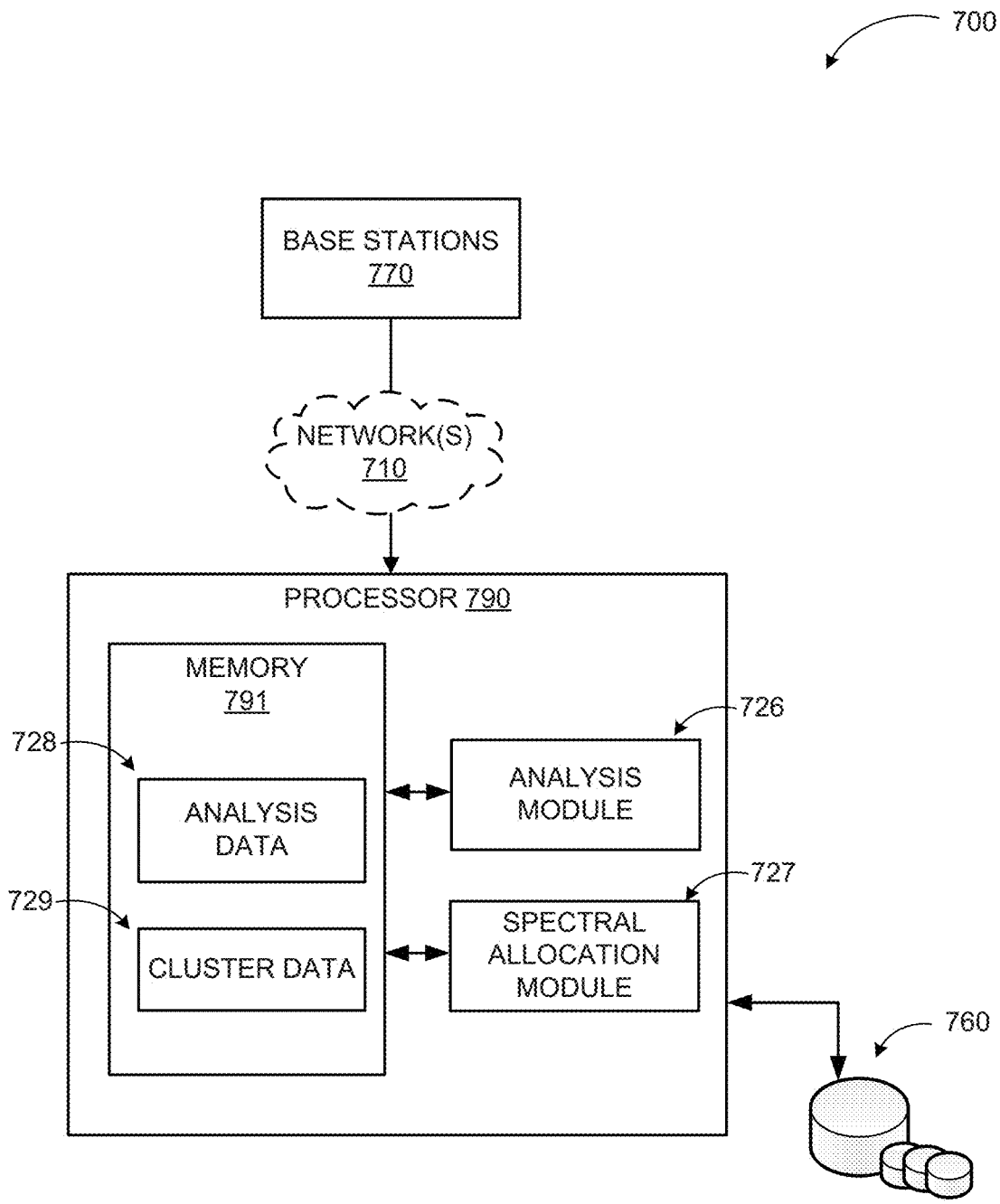
FIG. 7 illustrates a special purpose processor, which may be used to implement spectral allocation conflict resolution in wireless networks.

FIG. 7 illustrates a special purpose processor, which may be used to implement spectral allocation conflict resolution in wireless networks, arranged in accordance with at least some embodiments described herein.

Processor 790 may be part of a control system of base stations 770 through network(s) 710 for resolving spectral allocation conflicts in wireless networks. Processor 790 may also communicate with data source 760 storing network related information.

Processor 790 may include a number of processing modules such as an analysis module 726 and a spectral allocation module 727. Analysis data 728 and cluster data 729 may be used by processor 790 in conjunction with the analysis module 726 and the spectral allocation module 727 to determine overlapping time-frequency vectors, determining alternate time-frequency vectors with reduced or no overlap, and instructing wireless devices to use the alternate time-frequency vectors. Analysis data 728 and cluster data 729 may be stored during processing in memory 791, which may be a cache memory of the processor 790 or an external memory (e.g., memory external to processor 790).

Example embodiments may also include methods for resolving spectral allocation conflicts in wireless networks. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 8:
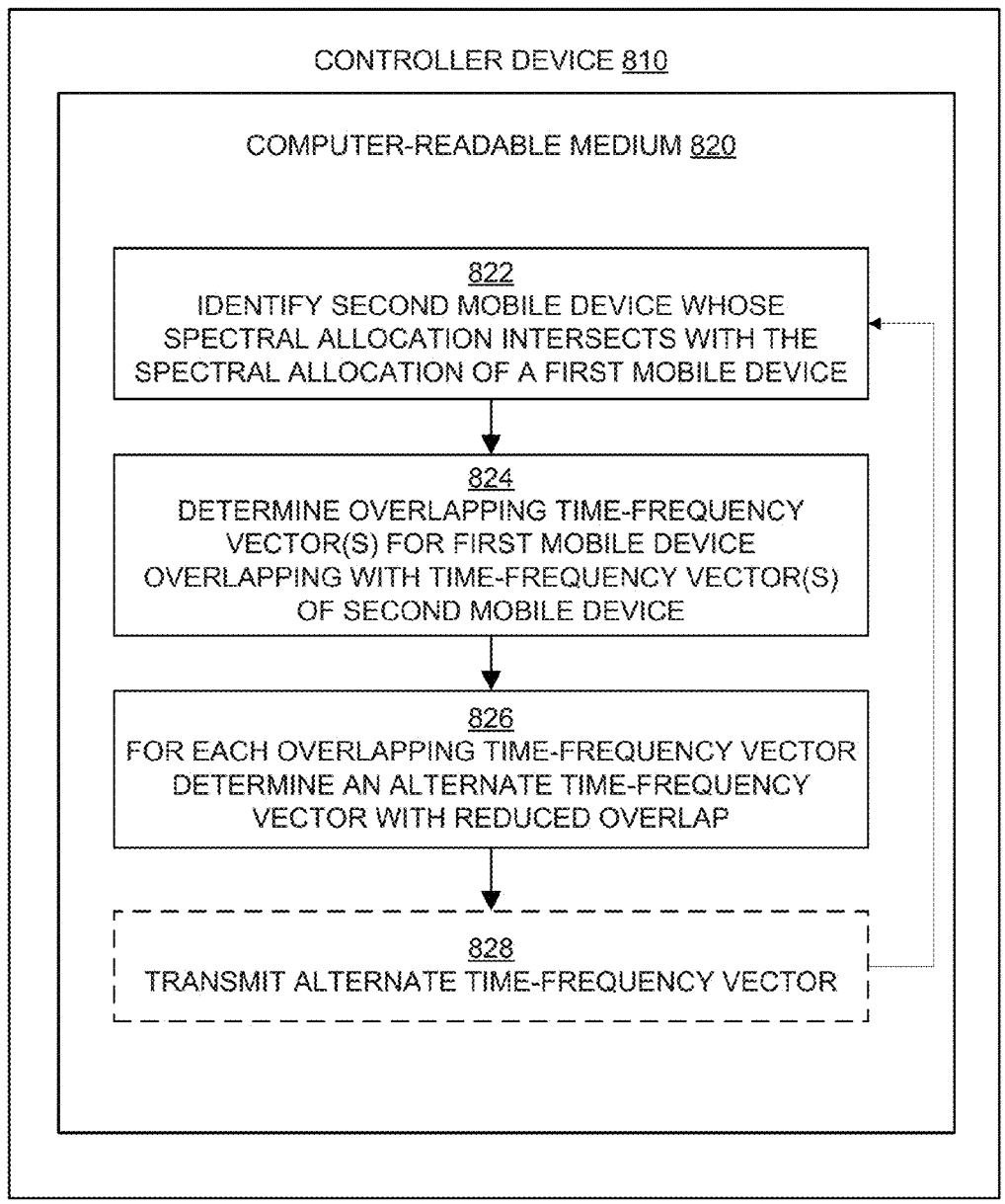
FIG. 8 is a flow diagram illustrating an example method for resolving spectral allocation conflicts in wireless networks that may be performed by a computing device such as the computing device in FIG. 6 or the special purpose processor of FIG. 7.

FIG. 8 is a flow diagram illustrating an example method for resolving spectral allocation conflicts in wireless networks that may be performed by a computing device such as the computing device in FIG. 6 or the special purpose processor of FIG. 7, arranged in accordance with at least some embodiments described herein.

Example methods may include one or more operations, functions or actions as illustrated by one or more of blocks 822, 824, 826, and 828, and may in some embodiments be performed by a computing device such as the computing device 600 in FIG. 6. The operations described in the blocks 822-828 may also be stored as computer-executable instructions in a computer-readable medium such as a computer-readable medium 820 of a computing device 810.

An example method for resolving spectral allocation conflicts in wireless networks may begin with block 822, "IDENTIFY SECOND MOBILE DEVICE WHOSE SPECTRAL ALLOCATION INTERSECTS WITH THE SPECTRAL ALLOCATION OF A FIRST MOBILE DEVICE," where processor 604 may identify two or more mobile devices with intersecting spectral allocations.

Block 822 may be followed by block 824, "DETERMINE OVERLAPPING TIME-FREQUENCY VECTOR(S) FOR FIRST MOBILE DEVICE OVERLAPPING WITH TIME-FREQUENCY VECTOR(S) OF SECOND MOBILE DEVICE", where the processor 604 may determine overlapping time-frequency vectors of the spectral allocations of the identified mobile devices.

Block 824 may be followed by block 826, "FOR EACH OVERLAPPING TIME-FREQUENCY VECTOR DETERMINE AN ALTERNATE TIME-FREQUENCY VECTOR WITH REDUCED OVERLAP", where the processor 604 may determine an alternate time-frequency vector to replace one or more of the overlapping time-frequency vectors for one or both of the mobile devices such that the spectral allocation intersect is reduced partially or completely.

Block 826 may be followed by optional block 828, "TRANSMIT ALTERNATE TIME-FREQUENCY VECTOR", where the alternate time-frequency vector may be transmitted to the mobile device(s) as discussed previously.

The operations included in the processes of FIG. 8 described above are for illustration purposes. Resolving spectral allocation conflicts in wireless networks may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

FIG. 9 illustrates a block diagram of an example computer program product for implementing spectral allocation conflict resolution in wireless networks, arranged in accordance with at least some embodiments described herein.

In some examples, as shown in FIG. 9, computer program product 900 may include a signal bearing medium 902 that may also include machine readable instructions 904 that, when executed by, for example, a processor, may provide the functionality described above with respect to FIG. 1 through FIG. 5. Thus, for example, referring to processor 790, one or more of the tasks shown in FIG. 9 may be undertaken in response to instructions 904 conveyed to the processor 790 by medium 902 to perform actions associated with performing reduction of spectral allocation conflicts in mobile networks as described herein. Some of those instructions may include identifying second mobile device whose spectral allocation intersects with the spectral allocation of a first mobile device; determining overlapping time-frequency vector(s) for first mobile device overlapping with time-frequency vector(s) of second mobile device; for each overlapping time-frequency vector determining an alternate time-frequency vector with reduced overlap; and transmitting the alternate time-frequency vector.

In some implementations, signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, computer program product 900 may be conveyed to the processor 604 by an RF signal bearing medium 902, where the signal bearing medium 902 is conveyed by a wireless communications medium 910 (e.g., a wireless communications medium conforming with the IEEE 802.11 standard).

In some examples, various methods for reducing spectral allocation conflicts in wireless networks are described. Example methods may include identifying a second mobile device with a second spectral allocation, for a first mobile device with a first spectral allocation, where there is an intersection between the first spectral allocation and the second spectral allocation. Example methods may also include determining, for the first mobile device, one or more time-frequency vectors of the first spectral allocation that overlap with one or more time-frequency vectors of the second spectral allocation of the second mobile device. The methods may further include for each determined time-frequency vector, determining an alternate time-frequency vector such that a second overlap between the alternate time-frequency vector and the one or more time-frequency vectors of the second spectral allocation is lower than the first overlap.

In other examples, the method may further include transmitting the alternate time-frequency vector to the first mobile device, for example, by transmitting a set of frequencies to be used in successive time slots. Determining one or more time-frequency vectors of the first spectral allocation may include determining a distance between the time-frequency vectors of the first mobile device and the time-frequency vectors of the second mobile device. The distance may be a Hamming distance or a Levenshtein distance.

In further examples, identifying the second mobile device with the second spectral allocation may include determining that the intersection exceeds a predefined threshold. The method may also include determining the predefined threshold based on an error-correction mechanism associated with the first mobile device. Determining the alternate time-frequency vector may include selecting a time-frequency vector from a good cluster of time-frequency vectors for the first mobile device, where the good cluster is based on one or more of a device location, a time, and a quality indicator associated with the first mobile device. Selecting the time-frequency vector from the good cluster may include selecting a time-frequency vector that is substantially near an edge of the good cluster.

According to yet other examples, the first spectral allocation for the first mobile device may include one or more time-frequency vectors substantially near a center of the good cluster for the first mobile device. The method may further include performing the spectral allocation over a wireless communication technology that utilizes one of frequency division multiple access (FDMA), orthogonal frequency division multiple access (OFDMA), Carrier-Sense Multiple Access (CSMA), or a narrow band allocation technology. The method may also include determining the alternate time-frequency vector such that the alternate time-frequency vector does not overlap with the one or more time-frequency vectors of the second spectral allocation.

In other examples, controllers for a wireless network configured to employ spectral allocation conflict reduction are described. An example controller may include a communication module configured to communicate with a plurality of mobile devices over a wireless network and a processor coupled to the communication module. The processor may be configured to identify a second mobile device with a second spectral allocation, for a first mobile device with a first spectral allocation, where there is an intersection between the first spectral allocation and the second spectral allocation. The processor may also determine, for the first mobile device, one or more time-frequency vectors of the first spectral allocation that overlap with one or more time-frequency vectors of the second spectral allocation of the second mobile device. The processor may further determine an alternate time-frequency vector for each determined time-frequency vector such that an overlap between the alternate time-frequency vector and the one or more time-frequency vectors of the second spectral allocation is lower than the first overlap.

According to some examples, the communication module may be configured to transmit the alternate time-frequency vector to the first mobile device by transmitting a set of frequencies to be used in successive time slots. The processor may be further configured to determine a distance between the time-frequency vectors of the first mobile device and the time-frequency vectors of the second mobile. The distance may be a Hamming distance or a Levenshtein distance. The processor may also be configured to determine that the intersection exceeds a predefined threshold in order to identify the second mobile device with the second spectral allocation.

According to further examples, the processor may be further configured to determine the predefined threshold based on an error-correction mechanism associated with the first mobile device. The processor may be configured to determine the alternate time-frequency vector by selecting a time-frequency vector from a good cluster of time-frequency vectors for the first mobile device, where the good cluster is based on one or more of a device location, a time, and a quality indicator associated with the first mobile device. The processor may be further configured to select a time-frequency vector that is substantially near an edge of the good cluster.

According to yet other examples, the first spectral allocation for the first mobile device may include one or more time-frequency vectors substantially near a center of the good cluster for the first mobile device. The processor may be further configured to reallocate the first mobile device and the second mobile device to new time-frequency vectors away from each other until the spectral allocation intersect drops below a predefined threshold. The processor may also be configured to perform the spectral allocation over a wireless communication technology that utilizes one of frequency division multiple access (FDMA), orthogonal frequency division multiple access (OFDMA), Carrier-Sense Multiple Access (CSMA), or a narrow band allocation technology. The processor may be further configured to determine the alternate time-frequency vector such that the alternate time-frequency vector does not overlap with the one or more time-frequency vectors of the second spectral allocation. The controller may be part of a base station.

In further examples, an analysis server for analyzing sub-carrier allocation data to categorize clusters for predictive spectral allocation in wireless networks is described. The analysis server may include a memory configured to store instructions and a processor coupled to the memory. The processor may be configured to identify a second mobile device with a second spectral allocation, for a first mobile device with a first spectral allocation, where there is an intersection between the first spectral allocation and the second spectral allocation. The processor may also determine, for the first mobile device, one or more time-frequency vectors of the first spectral allocation that overlap with one or more time-frequency vectors of the second spectral allocation of the second mobile device. The processor may further determine an alternate time-frequency vector for each determined time-frequency vector such that an overlap between the alternate time-frequency vector and the one or more time-frequency vectors of the second spectral allocation is lower than the first overlap.

According to some examples, the processor may be further configured to transmit the alternate time-frequency vector to the first mobile device. The processor may also be configured to cause the one or more base stations to transmit a set of frequencies to be used in successive time slots. The processor may be further configured to determine a distance between the time-frequency vectors of the first mobile device and the time-frequency vectors of the second mobile device. The distance may be a Hamming distance or a Levenshtein distance.

According to other examples, the processor may be configured to determine that the intersection exceeds a predefined threshold in order to identify the second mobile device with the second spectral allocation. The processor may be further configured to determine the predefined threshold based on an error-correction mechanism associated with the first mobile device. The processor may be configured to determine the alternate time-frequency vector by selecting a time-frequency vector from a good cluster of time-frequency vectors for the first mobile device, where the good cluster is based on one or more of a device location, a time, and a quality indicator associated with the first mobile device. The processor may also be configured to select a time-frequency vector that is substantially near an edge of the good cluster.

According to further examples, the first spectral allocation for the first mobile device may include one or more time-frequency vectors substantially near a center of the good cluster for the first mobile device. The processor may be further configured to reallocate the first mobile device and the second mobile device to new time-frequency vectors away from each other until the spectral allocation intersect drops below a predefined threshold. The processor may be further configured to perform the spectral allocation over a wireless communication technology that utilizes one of frequency division multiple access (FDMA), orthogonal frequency division multiple access (OFDMA), Carrier-Sense Multiple Access (CSMA), or a narrow band allocation technology.

According to other examples, the processor may be further configured to determine the alternate time-frequency vector such that the alternate time-frequency vector does not overlap with the one or more time-frequency vectors of the second spectral allocation. The analysis server may be configured to receive information from the first and second mobile devices via one or more base stations. The wireless network may be an Evolved Universal Mobile Telecommunications System Terrestrial Radio Access Network (eUTRAN), a long term evolution (LTE) network, an LTE-Advanced network, a high speed packet access (HSPA) network, or an advanced HSPA network.

In yet other examples, methods for reducing spectral allocation conflicts in wireless networks are described. An example method may include identifying a second antenna of a wireless device with a second spectral allocation for a first antenna of the same wireless device with a first spectral allocation, where there is an intersection between the first spectral allocation and the second spectral allocation. The example method may further include determining, for the first antenna, one or more time-frequency vectors of the first spectral allocation that overlap with one or more time-frequency vectors of the second spectral allocation of the second antenna. The method may also include for each determined time-frequency vector, determining an alternate time-frequency vector such that an overlap between the alternate time-frequency vector and the one or more time-frequency vectors of the second spectral allocation is lower than the first overlap.

According to some examples, the method may include transmitting the alternate time-frequency vector to the first antenna. The first and the second antennas may be attached to a same enclosure associated with the wireless device.

In yet further examples, a computer-readable storage medium with instructions stored thereon for reducing spectral allocation conflicts in wireless networks is described. The instructions may cause a method to be performed when executed, where the method is similar to the example method described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to reduce spectral allocation conflicts in wireless networks, the method comprising:
    tracking, by a processor, for a first mobile device with a first spectral allocation, other nearby mobile devices whose spectral intersection with the first mobile device is above a predefined threshold, wherein the redefined threshold is based on a power and complexity of an error-correcting code employed by the first mobile device;
    identifying, by the processor, a second mobile device with a second spectral allocation from the other nearby mobile devices, wherein there is an intersection between the first spectral allocation and the second spectral allocation;
    determining, by the processor, one or more time-frequency vectors of the first spectral allocation of the first mobile device with a first overlap with one or more time-frequency vectors of the second spectral allocation of the second mobile device by determining a distance between the time-frequency vectors of the first mobile device and the time-frequency vectors of the second mobile device; and
    for each determined time-frequency vectors of the first spectral allocation with the first overlap, determining, by the processor, an alternate time-frequency vector such that a second overlap between the alternate time-frequency vector and the one or more time-frequency vectors of the second spectral allocation is lower than the first overlap.

2. The method according to claim 1, further comprising transmitting, by the processor, the alternate time-frequency vector to the first mobile device by transmitting a set of frequencies to be used in successive time slots.

3. The method according to claim 1, wherein determining the alternate time-frequency vector comprises selecting, by the processor, a time-frequency vector from a particular cluster of time-frequency vectors for the first mobile device, wherein the particular cluster is based on one or more of a device location, a time, and a quality indicator associated with the first mobile device.

4. The method according to claim 3, wherein selecting the time-frequency vector from the particular cluster comprises selecting, by the processor, a time-frequency vector that is substantially near an edge of the particular cluster.

5. The method according to claim 1, further comprising performing, by the processor, the spectral allocation over a wireless communication technology that utilizes one of frequency division multiple access (FDMA), orthogonal frequency division multiple access (OFDMA), Carrier-Sense Multiple Access (CSMA), or a narrow band allocation technology.

6. The method according to claim 1, further comprising determining, by the processor, the alternate time-frequency vector such that the alternate time-frequency vector does not overlap with the one or more time-frequency vectors of the second spectral allocation.

7. A controller for a wireless network configured to employ spectral allocation conflict reduction, the controller comprising:
a communication module configured to communicate with a plurality of mobile devices, including at least a first mobile device and a second mobile device, over a wireless network;
a memory configured to store instructions; and
a processor coupled to the communication module and the memory, wherein the processor comprises:
an analysis module configured to:
for the first mobile device with a first spectral allocation, identify the second mobile device with a second spectral allocation, wherein there is an intersection between the first spectral allocation and the second spectral allocation;
determine, for the first mobile device, one or more time-frequency vectors of the first spectral allocation with a first overlap with one or more time-frequency vectors of the second spectral allocation of the second mobile device; and
for each determined time-frequency vector of the first spectral allocation with the first overlap, determine an alternate time-frequency vector such that a second overlap between the alternate time-frequency vector and the one or more time-frequency vectors of the second spectral allocation lower than the first overlap by:
determining one or more time slots of each determined time-frequency vector within the first overlap; and
for each of the determined time slots, selecting an unoccupied time slot nearest to the each of the determined time slots to change a frequency allocation; and
a spectral allocation module coupled to the analysis module, the spectral allocation module configured to transmit the alternate time-frequency vector to the first mobile device by transmitting a set of frequencies to be used in successive time slots.

8. The controller according to claim 7, wherein the analysis module is further configured to determine a distance between the time-frequency vectors of the first mobile device and the time-frequency vectors of the second mobile.

9. The controller according to claim 8, wherein the distance is one of a Hamming distance and a Levenshtein distance.

10. The controller according to claim 7, wherein the analysis module is configured to determine the alternate time-frequency vector by selecting a time-frequency vector from a particular cluster of time-frequency vectors for the first mobile device, wherein the particular cluster is based on one or more of a device location, a time, and a quality indicator associated with the first mobile device.

11. The controller according to claim 10, wherein the first spectral allocation for the first mobile device comprises one or more time-frequency vectors substantially near a center of the particular cluster for the first mobile device.

12. The controller according to claim 7, wherein the spectral allocation module is further configured to reallocate the first mobile device and the second mobile device to new time-frequency vectors away from each other until the spectral allocation intersect drops below a predefined threshold.

13. The controller according to claim 7, wherein the analysis module is further configured to determine the alternate time-frequency vector such that the alternate time-frequency vector does not overlap with the one or more time-frequency vectors of the second spectral allocation.

14. The controller according to claim 7, wherein the controller is part of a base station.

15. An analysis server to analyze sub-carrier allocation data to categorize clusters for predictive spectral allocation in wireless networks, the analysis server comprising:
a memory configured to store instructions; and
a processor coupled to the memory, wherein the processor comprises:
an analysis module configured to:
track, for a first mobile device with a first spectral allocation, other nearby mobile devices whose spectral intersection with the first mobile device is above a redefined threshold, wherein the predefined threshold is based on a power and complexity of an error-correcting code employed by the first mobile device;
identify a second mobile device with a second spectral allocation from the other nearby mobile devices, wherein there is an intersection between the first spectral allocation and the second spectral allocation;
determine, for the first mobile device, one or more time-frequency vectors of the first spectral allocation with a first overlap with one or more time-frequency vectors of the second spectral allocation of the second mobile device; and
for each determined time-frequency vector, determine an alternate time-frequency vector such that a second overlap between the alternate time-frequency vector and the one or more time-frequency vectors of the second spectral allocation lower than the first overlap by:
determining one or more time slots of each determined time-frequency vector within the first overlap; and
for each of the determined time slots, selecting an unoccupied time slot nearest to the each of the determined time slots to change a frequency allocation.

16. The analysis server according to claim 15, wherein the analysis module is further configured to determine a distance between the time-frequency vectors of the first mobile device and the time-frequency vectors of the second mobile device.

17. The analysis server according to claim 16, wherein the distance is one of a Hamming distance and a Levenshtein distance.

18. The analysis server according to claim 15, wherein the analysis module is configured to:
determine the alternate time-frequency vector by selecting a time-frequency vector from a particular cluster of time-frequency vectors for the first mobile device, wherein the particular cluster is based on one or more of a device location, a time, and a quality indicator associated with the first mobile device; and select a time-frequency vector that is substantially near an edge of the particular cluster.

19. The analysis server according to claim 18, wherein the first spectral allocation for the first mobile device comprises one or more time-frequency vectors substantially near a center of the particular cluster for the first mobile device.

20. The analysis server according to claim 15, further comprising a spectral allocation module configured to reallocate the first mobile device and the second mobile device to new time-frequency vectors away from each other until the spectral allocation intersect drops below the predefined threshold.

21. The analysis server according to claim 15, wherein the analysis server is configured to receive information from the first and second mobile devices via one or more base stations.

* * * * *